United States Patent
Ishii et al.

(10) Patent No.: US 6,723,403 B2
(45) Date of Patent: Apr. 20, 2004

(54) MULTI-LAYER CONTAINER STRUCTURE

(75) Inventors: Ikuya Ishii, Himeji (JP); Hiroshi Odaka, Himeji (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/055,932

(22) Filed: Jan. 28, 2002

(65) Prior Publication Data
US 2002/0168490 A1 Nov. 14, 2002

Related U.S. Application Data

(63) Continuation of application No. 09/022,381, filed on Feb. 12, 1998, now abandoned.

(30) Foreign Application Priority Data

Feb. 17, 1997 (JP) ............................................. 9-032232
Feb. 17, 1997 (JP) ............................................. 9-032233

(51) Int. Cl.$^7$ ............................................. B32B 27/08
(52) U.S. Cl. ...................... 428/35.7; 428/216; 428/363; 428/402
(58) Field of Search ............................... 428/35.7, 216, 428/363, 402

(56) References Cited

U.S. PATENT DOCUMENTS 4,626,456 A 12/1986 Farrell et al.

FOREIGN PATENT DOCUMENTS

| DE | 3613155 A1 | 11/1987 |
| EP | 0 338 488 | 10/1989 |
| EP | 0 437 856 A2 | 7/1991 |
| EP | 0 461 640 A1 | 12/1991 |
| JP | 6071824 | 3/1994 |
| JP | 7032555 | 2/1995 |
| JP | 8230120 | 9/1996 |

*Primary Examiner*—Sandra M. Nolan
(74) *Attorney, Agent, or Firm*—Oblon, Spivak, McClelland, Maier & Neustadt, P.C.

(57) ABSTRACT

A multi-layer structure having two or more layers which comprises a surface layer (a) comprising a thermoplastic resin and having a thickness of 10 to 80 $\mu$m and an adjacent layer (b) comprising a thermoplastic resin or a thermoplastic resin containing an inorganic filler, an interlaminar peeling strength between the surface layer (a) and the adjacent layer (b) being in the range of 0.3 to 2.0 kg/15 mm; and a container comprising this multi-layer structure, wherein the container is excellent in sealing properties, heat resistance and opening properties.

8 Claims, No Drawings

MULTI-LAYER CONTAINER STRUCTURE

This application is a continuation of U.S. Ser. No. 09/022,381, filed Feb. 12, 1998, now abandoned.

BACKGROUND OF THE INVENTION (i) Field of the Invention

The present invention relates to a multi-layer structure, a container using the same, and its manufacturing method. More specifically, it relates to a multi-layer structure suitable for the manufacture of containers particularly in a packing field, a container which can be obtained by the use of this multi-layer structure, can be used for the packing of foods, drugs, cosmetics and the like and which has excellent sealing properties and easy opening properties, and a method for efficiently manufacturing the container.

(ii) Description of the Invention

Particularly in carrying out the packing of drugs, foods, cosmetics and the like, these contents are filled into containers, and after sealing, they are heated for sterilization by boil, retort, microwave or the like. At this time, the breakage of the containers and the deterioration of a container material occur on occasion owing to expansion by the heating and the like. In addition, when the sealing properties of the containers are increased for the sake of the breakage prevention of the containers, the opening of the containers tends to be difficult. Therefore, it has been desired to improve the sealing properties or to prevent the deterioration, keeping up the opening properties.

In order to improve the sealing properties and to keep up the easy opening properties at a high temperature, it has been suggested to use heat-resistant resins for an innermost layer (a surface layer) and an intermediate layer under the innermost layer, and for example, Japanese Patent Application Laid-open No. 230120/1996 has disclosed a laminate which is constituted of an innermost layer comprising a polypropylene resin, an intermediate comprising a mixture of 20 to 90% by weight of a polypropylene and 80 to 10% by weight of a 4-methylpentene-1 resin, and a base layer comprising a polypropylene resin. However, such a laminate is expensive, and it has a drawback that at the time of the thermoforming of containers, the molding is difficult. Moreover, it is also difficult to mold films from the molding multi-layer structure by co-extrusion, depending on the constitution of the resins.

On the other hand, in Japanese Patent Application Laid-open No. 71824/1994, there has been disclosed a container in which a base layer, an adhesive layer, a polypropylene, a polyethylene and a polypropylene are laminated in this order on an outer layer, and the container having flanges is molded by the use of composite sheets having an interlaminar adhesive force relation of X<Y wherein X is an interlaminar adhesive force between the polypropylene layer as an innermost layer and the adjacent polyethylene layer, and Y is an interlaminar adhesive force between the polyethylene layer and the polypropylene layer constituting the outside of the polyethylene layer, and after the filling of contents, the container is sealed up with a lid so that an inter-laminar adhesive force Z between the lid and the polypropylene layer as the innermost layer of the flanges may be Z>X. In this container, the innermost layer is made of the polypropylene to improve heat resistance, and therefore the deterioration of the base material can be prevented. In addition, the seal layer and the opening layer are separately formed to improve the opening properties. However, the disclosed container has a drawback that sealing properties at the time of heating are poor because of the intermediate layer being the polyethylene layer.

Furthermore, Japanese Patent Application Laid-open No. 29324/1990 had disclosed a multi-layer structure in which an interlaminar peeling strength is suitably regulated by the use of a thermoplastic resin containing a flaky inorganic filler as an intermediate layer. However, this multi-layer structure has a drawback that the opening properties are bad when the surface layer is thick, and the sealing properties at heating are poor when the intermediate layer is thin.

SUMMARY OF THE INVENTION

An object of the present invention is to provide a multi-layer structure which can suitably be used to manufacture containers in which sealing properties are improved for the prevention of container breakage during sterilization by heating, cooking by heating, distribution or the like and heat resistance is improved for the prevention of container deterioration and which is excellent in opening properties.

Another object of the present invention is to provide a container comprising this multi-layer structure and having the above-mentioned excellent characteristics.

Still another object of the present invention is to provide a method for efficiently preparing the above-mentioned container.

The present inventors have intensively researched to achieve the above-mentioned objects. As a result, it has been found that the above-mentioned objects can be achieved by a multi-layer structure having two or more layers in which an interlaminar peeling strength between a surface layer and an adjacent layer is in a specific range, particularly a multi-layer structure which comprises a base layer, an intermediate layer having a specific thickness and a surface layer mainly comprising a polypropylene resin and having a specific thickness on the base layer and in which each interlaminar peeling strength meets specific conditions, and a container comprising this multi-layer structure. Furthermore, the present inventors have also found that when thermoforming is carried out by pressing portions, which will become flanges of the molded container, under a specific pressure, the desired container can efficiently be obtained.

The present invention has been completed on the basis of such knowledge.

That is to say, aspects of the present invention are as follows.

(1) The first aspect of the present invention is directed to a multi-layer structure having two or more layers which comprises a surface layer (a) comprising a thermoplastic resin and having a thickness of 10 to 80 $\mu$m and an adjacent layer (b) comprising a thermoplastic resin or a thermoplastic resin containing an inorganic filler, an interlaminar peeling strength between the surface layer (a) and the adjacent layer (b) being in the range of 0.3 to 2.0 kg/15 mm (hereinafter referred to as "the multi-layer structure I").

(2) The second aspect of the present invention is directed to the multi-layer structure according to the above-mentioned first aspect wherein an intermediate layer (B) comprising a thermoplastic resin containing 20 to 70% by weight of a platelike inorganic filler and having a thickness of 50 $\mu$m or more and a surface layer (A) comprising a thermoplastic resin containing 60 to 100% by weight of a polypropylene resin and having a thickness of 10 to 80 $\mu$m are laminated in this order on a base layer (C); an interlaminar peeling strength [(A)/(B)] between the surface layer (A) and the intermediate layer (B) is in the range of 0.3 to 2.0 kg/15 mm;

and an interlaminar peeling strength [(B)/(C)] between the intermediate layer (B) and the base layer (C) satisfies a relation of [(A)/(B)]<[(B)/(C)] (hereinafter referred to as "the multi-layer structure II").

(3) The third aspect of the present invention is directed to a container comprising the multi-layer structure I described in the above-mentioned first aspect (hereinafter referred to as "the container I").

(4) The fourth aspect of the present invention is directed to a container comprising the multi-layer structure II described in the above-mentioned second aspect (hereinafter referred to as "the container II").

(5) The fifth aspect of the present invention is directed to a method for manufacturing a container which comprises the steps of heating the multi-layer structure described in claim 1, and then thermoforming the container by pressing portions, which will become flanges of the molded container, under a press pressure of 1.0 to 10.0 kg/cm$^2$.

(6) The sixth aspect of the present invention is directed to a container manufactured by the method described in the fifth aspect of the present invention.

DETAILED DESCRIPTION OF THE INVENTION

A multi-layer structure I of the present invention is a laminate comprising two or more layers of a surface layer (a) and its adjacent layer (b).

The surface layer (a) is a layer comprising a thermoplastic resin and having a thickness of 10 to 80 μm. No particular restriction is put on the kind of thermoplastic resin, and various thermoplastic resins can be used. Examples of the thermoplastic resins include polyolefins such as polyethylene and polypropylene, polystyrene resins, polyamide resins, polyester resins, polycarbonate resins, ethylene-vinyl alcohol copolymers, polyvinylidene chloride resins and polyacrylic acid resins. These thermoplastic resins can be used singly or in the form of a mixture of two or more thereof.

Furthermore, the resin or the resin mixture which can be used to form the surface layer (a) can be blended with some additives and an inorganic filler. Examples of the additives include a thermoplastic elastomer, an antioxidant, a neutralizing agent, a light stabilizer, an ultraviolet light absorber, a heavy metal inactive agent, a plasticizer, a nucleating agent, a pigment, a lubricant, an anti-blocking agent and an antibacterial agent, and example of the inorganic filler include talc, mica, silica and calcium carbonate.

In the multi-layer structure I of the present invention, the surface layer (a) is formed so that its thickness may be in the range of 10 to 80 μm, preferably 20 to 60 μm. If this thickness is less than 10 μm, a sealing strength is poor, and if it is more than 80 μm, opening properties deteriorate.

Furthermore, in order to improve the sealing properties of the surface layer (a), it is preferable that the material of the surface layer (a) is the same as that of the seal surface of a lid with which a container will be heat-sealed.

On the other hand, the adjacent layer (b) comprises a thermoplastic resin or a thermoplastic resin containing an inorganic filler. No particular restriction is put on the kind of thermoplastic resin, and various thermoplastic resins can be used. Examples of the thermoplastic resins include polyolefin resins such as polyethylene and polypropylene, polystyrene resins, polyamide resins, polyester resins, polycarbonate resins, ethylene-vinyl alcohol copolymers, polyvinylidene chloride resins and polyacrylic acid resins. These thermoplastic resins can be used singly or in a combination of two or more thereof.

No particular restriction is put on the kind of inorganic filler, and various inorganic fillers can be used. Examples of the inorganic fillers include talc, titanium oxide, kaolin, clay, aluminum hydroxide, graphite, sericite, barytes, scolecite, mica, silica, calcium carbonate, calcium oxide and lithium oxide. These inorganic fillers can be used singly or in a combination of two or more thereof.

The blend of the inorganic filler can contribute to the improvement of heat resistance, and the inorganic filler can be added in an amount of 0 to 70% by weight, preferably 50 to 70% by weight to the adjacent layer (b). If the amount of the inorganic filler is in excess of 70% by weight, melt extrusion cannot be carried out any more.

Furthermore, the above-mentioned resin or resin mixture can be blended with any of various additives such as a thermoplastic elastomer, an antioxidant, a neutralizing agent, a light stabilizer, an ultraviolet light absorber, a heavy metal inactive agent, a plasticizer, a nucleating agent, a pigment, a lubricant, an anti-blocking agent and an antibacterial agent.

The multi-layer structure I of the present invention comprises at least two layers of the layers (a) and (b) as described above, but either or both of a base layer (c) and the surface layer (a) may be formed on the outside of the adjacent layer (b), i.e., a surface of the adjacent layer (b) opposite to the surface layer (a).

Examples of the base layer (c) include the same thermoplastic resins as mentioned above, metals such as aluminum, and laminates of combinations thereof. To the thermoplastic resin which can be used as the base layer, any of the same additives and inorganic fillers as mentioned above can be added.

Typical constitutional examples of the base layer include

PO (the single layer)
PO+the inorganic filler (the single layer)
PO/AD/EVOH/AD/PO (the last PO is the outer layer)
PO/PO/AD/EVOH/AD/PO (the last PO is the outer layer)
PO/AD/EVOH/AD/PO/PO (the last PO is the outer layer)
AD/Al (Al is the outer layer)
AD/Al/AD/PO (PO is the outer layer)

wherein PO is a polyolefin resin such as polypropylene or polyethylene, or a blend thereof; AD is an adhesive such as a modified polypropylene; EVOH is an ethylene-vinyl alcohol copolymer; and Al is aluminum.

Of the base layers made of these various materials, the base layer comprising the same polyolefin resins is preferable, because such a base layer can be collected as a scrap and then reused. In addition, the PO layer can also be reused by the collection as the scrap.

In the multi-layer structure I of the present invention, an interlaminar peeling strength (a)/(b) between the surface layer (a) and the adjacent layer (b) is regulated in the range of 0.3 to 2.0 kg/15 mm, preferably 0.3 to 1.0 kg/15 mm. Here, the interlaminar peeling strength means a value measured at an angle of 180°, a sample width of 15 mm and a peeling velocity of 300 mm/min by a peeling method. If this interlaminar peeling strength is less than 0.3 kg/15 mm, the good sealing properties cannot be obtained, so that peeling tends to occur, and on the other hand, if it is more than 2.0 kg/15 mm, the opening properties are poor, so that the peeling is impossible on occasion.

The above-mentioned interlaminar peeling strength can be controlled in an optional manner, for example, by regulating the constitution of the mutually contact layers, or by selecting an adhesive or a molding method. In the case of co-extrusion, the interlaminar peeling strength can be increased by using one kind of resin for the contact layers, or it can be decreased by the use of different resins or by the blend of an inorganic substance or the like.

Next, the multi-layer structure II of the present invention is one embodiment of the above-mentioned multi-layer structure I, and it can be formed by laminating an intermediate layer (B) comprising a thermoplastic resin containing 20 to 70% by weight of a platelike inorganic filler and having a thickness of 50 $\mu$m or more and a surface layer (A) comprising a thermoplastic resin containing 60 to 100% by weight of a polypropylene resin and having a thickness of 10 to 80 $\mu$m in this order on a base layer (C).

The polypropylene resin which is the main component of this surface layer (A) may be a homopolymer of propylene, a block copolymer or a random copolymer of propylene and an $\alpha$-olefin such as ethylene, butene-1, pentene-1,3-methylbutene-1 or 4-methylpentene-1, or a mixture thereof. In the case that the copolymer is used, the content ratio of a copolymer monomer unit is preferably 10 mol % or less. Furthermore, the polypropylene resin is preferably such that a melt index is in the range of 0.1 to 20 g/10 min.

The surface layer (A) in this multi-layer structure II contains 60 to 100% by weight of the polypropylene resin. If the content of the polypropylene resin is less than 60% by weight, the heat resistance is poor, and thermal deteriorations such as melting, swelling and peeling might occur inconveniently. Thus, it is preferable that the content of the polypropylene resin is 100% by weight.

Furthermore, examples of the thermoplastic resin which can be used in addition to the polypropylene resin include polyolefin resins such as polyethylene, polystyrene resins, polyamide resins, polyester resins, polycarbonate resins, ethylene-vinyl alcohol copolymers, polyvinylidene chloride resins and polyacrylic acid resins.

Moreover, the resin or the resin mixture which forms the surface layer (A) may be blended with some additives and an inorganic filler. Examples of the additives include a thermoplastic elastomer, an anti-oxidant, a neutralizing agent, a light stabilizer, an ultraviolet light absorber, a heavy metal inactive agent, a plasticizer, a nucleating agent, a pigment, a lubricant, an anti-blocking agent and an antibacterial agent, and example of the inorganic filler include talc, mica, silica and calcium carbonate.

In the multi-layer structure II, the surface layer (A) is laminated so that its thickness may be in the range of 10 to 80 $\mu$m, preferably 20 to 40 $\mu$m. If this thickness is less than 10 $\mu$m, the sealing properties are poor, and if it is more than 80 $\mu$m, the opening properties deteriorate.

Furthermore, in order to improve the sealing properties of the surface layer (A), it is preferable that the material of the surface layer (A) is the same as that of the seal surface of a lid with which the container will be heat-sealed.

In the multi-layer structure II, the intermediate layer (B) comprises a thermoplastic resin containing 20 to 70% by weight of a platelike inorganic filler. No particular restriction is put on the kind of platelike inorganic filler, and various inorganic fillers can be used. Examples of the inorganic fillers include talc, titanium oxide, kaolin, clay, aluminum hydroxide, graphite, sericite, barytes, scolecite, mica which have any form of plates, thin pieces, leaves, flakes and the like.

The platelike inorganic filler can be added to the thermoplastic resin preferably in an amount of 20 to 70% by weight, more preferably 50 to 70% by weight. If the amount of the inorganic filler is less than 20% by weight, the interlaminar peeling strength increases, so that the opening properties are poor, and if it is more than 70% by weight, the interlaminar peeling strength decreases, so that the sealing properties tend to deteriorate. In addition, melt extrusion is also difficult.

No particular restriction is put on the thermoplastic resin which can be used for the intermediate layer (B), and examples of the thermoplastic resin include polyolefins such as polypropylene and polyethylene, polystyrene resins, polyamide resins, polyester resins, polycarbonate resins, ethylene-vinyl alcohol copolymers, polyvinylidene chloride resins and polyacrylic acid resins. These thermoplastic resins can be used singly or in a combination of two or more thereof.

Furthermore, the above-mentioned thermoplastic resin can be blended with any of various additives such as a thermoplastic elastomer, an antioxidant, a neutralizing agent, a light stabilizer, an ultraviolet light absorber, a heavy metal inactive agent, a plasticizer, a nucleating agent, a pigment, a lubricant, an anti-blocking agent and an antibacterial agent as well as inorganic fillers such as talc, mica, silica and calcium carbonate.

In the present invention, the thickness of the intermediate layer (B) is in the range of 50 $\mu$m or more, preferably 50 to 300 $\mu$m, more preferably 70 to 150 $\mu$m. If this thickness is less than 50 $\mu$m, the sealing properties (particularly at the time of heating) are poor, and on the other hand, if it is too thick, the intermediate layer (B) is liable to be brittle and heavy, and a cost also increases, particularly in the case that the content of the platelike inorganic filler is high.

No particular restriction is put on a material for the base layer (C) of the multi-layer structure II according to the present invention, and examples of the material for the base layer (C) include the same thermoplastic resins as enumerated as the thermoplastic resins which can be used for the above-mentioned surface layer (A) and intermediate layer (B), metals such as aluminum, and laminates of combinations thereof. The thermoplastic resin which can be used for the base layer can be blended with any of the same various additives and inorganic fillers as mentioned above.

This base layer (C) can possess the same constitution as in the base layer (c) in the above-mentioned multi-layer structure I.

Of the base layers made of the various materials, the base layer comprising the thermoplastic resin is preferable, because it can be collected as a scrap and then reused. In addition, the PO layer can also be reused by the collection as the scrap.

The multi-layer structure III of the present invention has at least 3 layers of the layers (A), (B) and (C) as described above, but the surface layer (A) may be formed on the outside of the base layer of the layer (C).

In the multi-layer structure II of the present invention, an interlaminar peeling strength [(A)/(B)] between the surface layer (A) and the intermediate layer (B) is regulated to 0.3 to 2.0 kg/15 mm, preferably 0.3 to 1.0 kg/15 mm. If this interlaminar peeling strength is less than 0.3 kg/15 mm, the good sealing properties cannot be obtained, so that peeling tends to occur, and on the other hand, if it is more than 2.0 kg/15 mm, the opening properties are poor, so that the peeling is impossible on occasion.

Furthermore, an interlaminar peeling strength [(B)/(C)] between the intermediate layer (B) and the base layer (C) is regulated so as to satisfy a relation of $[(A)/(B)]<[(B)/(C)]$. If the peeling strength between the layers (B) and (C) is the peeling strength between the layers (A) and (B) or less, the peeling is predominantly carried out between the layers (B) and (C), so that the innermost layer cannot be broken and the lid cannot be removed, with the result that the contents cannot be taken out sometimes.

The above-mentioned interlaminar peeling strength can be controlled in an optional manner, for example, by regulating the constitution of the respective adjacent layers, or selecting an adhesive or a molding method. In the case of co-extrusion, the peeling strength can be increased by using one kind of resin for the mutually adjacent layers, or on the other hand, it can be decreased by the use of different resins or by the blend of an inorganic substance or the like.

The multi-layer structures I and II of the present invention can be manufactured in various manners, and they are not particularly limited, but for example, these structures can be manufactured by a technique such as co-extrusion, co-extrusion blow molding or lamination. As the technique of the lamination, there can be used, for example, extrusion lamination, hot-melt lamination, dry lamination, wet lamination or heating lamination. From the viewpoint of the cost, it is usually preferable that the multi-layer structures I and II are manufactured by the co-extrusion.

According to the present invention, there are provided a container I comprising the above-mentioned multi-layer structure I and a container II comprising the above-mentioned multi-layer structure II. Each of the containers I and II of the present invention has an opening periphery for sealing the container with a lid in a circular form, and it can be manufactured from the above-mentioned multi-layer structure I or II by vacuum forming, air-pressure forming, press molding or plug-assist forming, or it can be manufactured from the above-mentioned resins for the respective layers by injection molding, injection blow molding or blow molding, or it can be manufactured by the use of a combination of these techniques.

For the purpose of further improving the opening properties of the containers I and II according to the present invention, a weak notch can be formed on the inside of the circular sealing portion of the surface layer so as to cut the surface layer on the inside of the opening periphery of the container particularly in peeling the surface layer to open the container. Moreover, in the case that the container is manufactured from the above-mentioned multi-layer structure I or II by vacuum forming, air-pressure forming, press molding or plug-assist forming, the molding can be accomplished by cramping and then stretching flanges or flange step falls and portions which will be the flanges.

No particular restriction is put on the shape of the containers I and II, and they can take any shape of a cup, a tray, a box and the like having opening peripheries (flanges). For the easy opening of the container, an opening portion such as a drawing pen may be attached to the container, or a knob may be attached to the lid.

No particular restriction is put on a material of the lid, but the material which permits the tight seal of the container is preferable. It is particularly preferable that the sealant surface of the lid is made of the same resin as the surface layers of the containers I and II.

Next, a method for manufacturing the container of the present invention will be described.

In the present invention, the container can be manufactured from the above-mentioned multi-layer structure I by vacuum forming, air-pressure forming, press molding, plug-assist forming or a combination thereof, but this container has an opening flange for sealing the container with the lid in a circular form.

In the manufacturing method of the present invention, the above-mentioned multi-layer structure I is heated, and thermoforming is then carried out by pressing portions which will be the flanges of the container under a press pressure of 1.0 to 10.0 kg/cm$^2$, preferably 1.0 to 6.0 kg/cm$^2$. If the press pressure is less than 1.0 kg/cm$^2$, the sealing properties cannot be improved, and if it is more than 10.0 kg/cm$^2$, the sealing properties can be improved, but interfacial surfaces of the layers are turbulent, so that the peeling is impossible sometimes. In addition, a peeling strength increases, and the wall thickness of the flanges decreases inconveniently.

Also in the case that the above-mentioned multi-layer structure II is used, it is advantageous to manufacture the container by the same procedure as described above.

According to the present invention, there is further provided a container manufactured by the above-mentioned method.

As in the above-mentioned containers I and II, for the purpose of further improving the opening properties of this container, a weak notch can be formed on the inside of the circular sealing portion of the surface layer so as to cut the surface layer on the inside of the flange of the container particularly in peeling the surface layer to open the container.

No particular restriction is put on the shape of the container, and it can take any shape of a cup, a tray, a box and the like having flanges for heat sealing. For the easy opening of the container, an opening portion such as a drawing pen may be attached to the container, or a knob may be attached to the lid.

No particular restriction is put on a material of the lid, but the material which permits the tight seal of the container is preferable. It is particularly preferable that the sealant surface of the lid is made of the same resin as the surface layer of the container.

By the utilization of a multi-layer structure of the present invention, containers can easily be obtained in which sealing properties are improved for the prevention of container breakage during sterilization by heating, cooking by heating, distribution or the like and heat resistance is improved for the prevention of container deterioration and which is excellent in opening properties.

Next, the present invention will be described in more detail in accordance with examples, but the scope of the present invention should not be limited to these examples.

EXAMPLES 1 to 7, COMPARATIVE EXAMPLES 1 to 4 and REFERENCE EXAMPLES 1 to 5

(1) Manufacture of Multi-Layer Structures

Resins for a surface layer (a), an adjacent layer (b) and a base layer (c) were simultaneously extruded by the use of 3 extruders using a feed block and a flat die to obtain multi-layer structures each comprising the following 4 constitutional layers:

The surface layer (a): which has a composition and a thickness shown in Table 1-1.

The adjacent layer (b): which has a composition and a thickness shown in Table 1-1.

The base layer (c): which comprises PP-2 (90% by weight) and HDPE (10% by weight) and has a thickness of 800 μm.

The surface layer (a): which is the same as the surface layer (a) mentioned above.

In Table 1-1, abbreviated symbols are used which have the following means:

PP-1: Polypropylene made by Idemitsu Petrochemical Co., Ltd.; trade name F-704NU PP-2: Polypropylene made by Idemitsu Petrochemical Co., Ltd.; trade name E-105GM LDPE: Low-density polyethylene made by Toso Co., Ltd.; trade name Petrocene 172

HDPE: High-density polyethylene made by Idemitsu Petrochemical Co., Ltd.; trade name 520MB Talc: Average particle diameter=5 $\mu$m (2) Manufacture of Containers Round containers having an opening diameter of 100 mm were molded at a spreading magnification of 2.0 by the use of the multi-layer structures obtained in the above-mentioned (1). These containers were prepared by heating the multi-layer structure in accordance with a plug-assist vacuum molding method, and then pressing portions which would be flanges of the containers under pressures shown in Table 1-2.

(3) Evaluation of the Containers (i) Measurement of Sealing Strength at Heating

The above-mentioned containers were heat-sealed with suitable lids, and then cut into pieces having a width of 15 mm. Next, each lid was pulled and peeled from the inside of the container at a velocity of 300 mm/mm so that an angle between the container and the lid might be 180°, and a maximum strength at this time was measured. The measurement was carried out under an atmosphere at 120° C. after this temperature was maintained for 8 minutes. The measured results are shown in Table 1-2.

(ii) Evaluation of Opening Properties

Each container was heat-sealed with the lid, and afterward the container was opened by cutting the lid. The opening properties of the container at this time were evaluated on the basis of the following standards, and the results are shown in Table 1-2.

○: The opening properties were good.

Δ: The opening properties were intermediate (the opening was slightly difficult).

X: The opening was impossible.

TABLE 1-1

| | Constitution of Resin (wt %) | | Thickness of (a) ($\mu$m) |
|---|---|---|---|
| | Surface Layer (a) | Adjacent Layer (b) | |
| Example 1 | HDPE (100) | PP-2 (80) LDPE (20) | 30 |
| Example 2 | HDPE (100) | PP-2 (80) LDPE (20) | 30 |
| Example 3 | PP-1 (100) | PP-2 (40) LDPE (60) | 30 |
| Example 4 | PP-1 (100) | PP-2 (40) LDPE (60) | 30 |
| Example 5 | PP-1 (100) | PP-2 (30) LDPE (15) Talc (55) | 30 |
| Example 6 | PP-1 (100) | PP-2 (30) LDPE (15) Talc (55) | 30 |
| Example 7 | PP-1 (100) | PP-2 (30) LDPE (15) Talc (55) | 30 |
| Comp. Ex. 1 | PP-1 (100) | PP-2 (30) LDPE (15) Talc (55) | 5 |
| Comp. Ex. 2 | PP-1 (100) | PP-2 (30) LDPE (15) Talc (55) | 90 |
| Comp. Ex. 3 | HDPE (100) | PP-2 (100) | 30 |
| Comp. Ex. 4 | PP-1 (100) | PP-2 (60) LDPE (20) Talc (20) | 30 |
| Ref. Ex. 1 | HDPE (100) | PP-2 (80) LDPE (20) | 30 |

TABLE 1-1-continued

| | Constitution of Resin (wt %) | | Thickness of (a) ($\mu$m) |
|---|---|---|---|
| | Surface Layer (a) | Adjacent Layer (b) | |
| Ref. Ex. 2 | HDPE (100) | PP-2 (80) LDPE (20) | 30 |
| Ref. Ex. 3 | PP-1 (100) | PP-2 (40) LDPE (60) | 30 |
| Ref. Ex. 4 | PP-1 (100) | PP-2 (40) LDPE (60) | 30 |
| Ref. Ex. 5 | PP-1 (100) | PP-2 (30) LDPE (15) Talc (55) | 30 |
| Ref. Ex. 6 | PP-1 (100) | PP-2 (30) LDPE (15) Talc (55) | 30 |

TABLE 1-2

| | Interlaminar Peeling Strength of (a)/(b) (kg/15 mm) | Press Pressure (kg/cm$^2$) | Sealing Strength at 120° C. during Heating (kg/15 mm width) | Opening Properties |
|---|---|---|---|---|
| Example 1 | 0.5 | 1.5 | 0.8 | ○ |
| Example 2 | 0.5 | 4.0 | 0.9 | ○ |
| Example 3 | 0.6 | 1.5 | 1.2 | ○ |
| Example 4 | 0.6 | 4.0 | 1.2 | ○ |
| Example 5 | 0.7 | 1.5 | 1.3 | ○ |
| Example 6 | 0.7 | 5.0 | 1.5 | ○ |
| Example 7 | 0.7 | 9.0 | 1.8 | Δ |
| Comp. Ex. 1 | 0.7 | 5.0 | 0.4 | ○ |
| Comp. Ex. 2 | 0.7 | 5.0 | 2.0 | X |
| Comp. Ex. 3 | 0.25 | 5.0 | 0.1 | ○ |
| Comp. Ex. 4 | 2.1 | 5.0 | 2.5 | X |
| Ref. Ex. 1 | 0.5 | 0.5 | 0.3 | ○ |
| Ref. Ex. 2 | 0.5 | 11.0 | 1.5 | X |
| Ref. Ex. 3 | 0.6 | 0.5 | 0.8 | ○ |
| Ref. Ex. 4 | 0.6 | 11.0 | 2.0 | X |
| Ref. Ex. 5 | 0.7 | 0.5 | 0.8 | ○ |
| Ref. Ex. 6 | 0.7 | 11.0 | 2.2 | X |

EXAMPLES 8 to 14, COMPARATIVE EXAMPLES 5 and 6, and REFERENCE EXAMPLES 7 and 8

(1) Manufacture of Multi-Layer Structures

Resins for a surface layer (A), an intermediate layer (B) and a base layer (C) were simultaneously extruded by the use of 3 extruders using a feed block and a flat die to obtain multi-layer structures each comprising the following 4 constitutional layers:

The surface layer (A): which has a composition and a thickness shown in Table 2-1.

The adjacent layer (B): which has a composition and a thickness shown in Table 2-1.

The base layer (C): which comprises PP-2 (90% by weight) and HDPE (10% by weight) and has a thickness of 800 $\mu$m.

The surface layer (A): which is the same as the surface layer (A) mentioned above.

In Table 2-1, abbreviated symbols are used which have the following means:

PP-1: Polypropylene made by Idemitsu Petrochemical Co., Ltd.; trade name F-704NV PP-2: Polypropylene made by Idemitsu Petrochemical Co., Ltd.; trade name E-105GM LDPE: Low-density polyethylene made by Toso Co., Ltd.; trade name Petrocene 172

HDPE: High-density polyethylene made by Idemitsu Petrochemical Co., Ltd.; trade name 520MB Talc: Average particle diameter=5 μm (2) Manufacture of Containers Tray-shaped containers having a volume of 240 ml were molded at a spreading magnification of 2.2 by the use of the multi-layer structures obtained in the above-mentioned (1). These containers were molded by cramping and stretching flanges.

(3) Evaluation of the Containers (i) Evaluation of Sealing Properties

To each of the above-mentioned containers, 150 ml of pure water was added, and after the heat sealing of the container at the lid, a retort (pressurizing and heating) treatment was carried out at 135° C. for 10 minutes. The evaluation was made on the basis of the number of broken containers (leaked containers) and partially peeled containers among 10 containers, and the results are shown in Table 2-2.

(ii) Evaluation of Opening Properties

Each container was heat-sealed at the lid, and afterward the container was opened by cutting the lid. The opening properties of the container at this time were evaluated on the basis of the following standards, and the results are shown in Table 2-2.

○: The opening properties were good.

Δ: The opening properties were intermediate (the opening was slightly difficult).

X: The opening was impossible.

TABLE 2-1

| | Constitution of Resin (wt %) | | Film Thickness (μm) | |
|---|---|---|---|---|
| | Surface Layer | Adjacent Layer | | |
| | (A) | (B) | (A) | (B) |
| Example 8 | PP-1 (100) | PP-2 (30) LDPE (15) Talc (55) | 30 | 50 |
| Example 9 | PP-1 (100) | PP-2 (30) LDPE (15) Talc (55) | 30 | 70 |
| Example 10 | PP-1 (100) | PP-2 (30) LDPE (15) Talc (55) | 30 | 100 |
| Example 11 | PP-1 (100) | PP-2 (30) LDPE (15) Talc (55) | 10 | 100 |
| Example 12 | PP-1 (100) | PP-2 (30) LDPE (15) Talc (55) | 80 | 100 |
| Example 13 | PP-1 (100) | PP-2 (40) LDPE (40) Talc (20) | 30 | 100 |
| Example 14 | PP-1 (60) LDPE (40) | PP-2 (30) LDPE (15) Talc (55) | 30 | 100 |
| Comp. Ex. 5 | PP-1 (100) | PP-2 (60) LDPE (20) Talc (20) | 30 | 100 |
| Comp. Ex. 6 | LDPE (100) | PP-2 (60) Talc (40) | 30 | 100 |
| Ref. Ex. 7 | PP-1 (100) | PP-2 (30) LDPE (15) Talc (55) | 30 | 25 |
| Ref. Ex. 8 | PP-1 (40) LDPE (60) | PP-2 (20) LDPE (15) Talc (65) | 30 | 100 |

TABLE 2-2

| | Interlaminar Peeling Strength (kg/15 mm) | | Number of[1]) Broken | Opening |
|---|---|---|---|---|
| | between (A)/(B) | between (B)/(C) | Containers/ Samples | Properties |
| Example 8 | 0.70 | Peeling was impossible | 1/10 | ○ |
| Example 9 | 0.70 | Peeling was impossible | 0/10 | ○ |
| Example 10 | 0.70 | Peeling was impossible | 0/10 | ○ |
| Example 11 | 0.70 | Peeling was impossible | 2/10 | ○ |
| Example 12 | 0.70 | Peeling was impossible | 0/10 | Δ |
| Example 13 | 1.00 | Peeling was impossible | 1/10 | Δ |
| Example 14 | 1.00 | Peeling was impossible | 1/10 | Δ |
| Comp. Ex. 5 | 2.10 | Peeling was impossible | 0/10 | X |
| Comp. Ex. 6 | 0.25 | Peeling was impossible | 10/10 | ○ |
| Ref. Ex. 7 | 0.70 | Peeling was impossible | 8/10 | ○ |
| Ref. Ex. 8 | 0.80 | 2.00 | 10/10 | Δ |

[1]): Number of broken containers and partially peeled containers/number of tested samples.

What is claimed is:

1. A multi-layer structure suitable for manufacturing easy opening containers which comprises,
    an intermediate layer (B) comprising a thermoplastic resin containing 50 to 70% by weight of a platelike inorganic filler and having a thickness of 50 μm or more, and
    a surface layer (A) consisting essentially of a polypropylene resin and having a thickness of 20 to 60 μm;
    wherein said layer (B) is laminated on a base layer (C) and said layer (A) is laminated on said layer (B);
    wherein an interlaminar peeling strength [(A)/(B)] between the surface layer (A) and the intermediate layer (B) is in the range of 0.3 to 2.0 kg/15 mm; and
    wherein the interlaminar peeling strength [(B)/(C)] between the intermediate layer (B) and the base layer (C) is greater than the interlaminar peeling strength [(A)/(B)].

2. An easy opening container comprising the multi-layer structure described in claim 1.

3. A method for manufacturing an easy opening container which comprises,
    heating a multi-layer structure comprising,
    an intermediate layer (B) comprising a thermoplastic resin containing 50 to 70% by weight of a platelike inorganic filler and having a thickness of 50 μm or more, and
    a surface layer (A) consisting essentially of a polypropylene resin and having a thickness of 20 to 60 μm;
    wherein said layer (B) is laminated on a base layer (C) and said layer (A) is laminated on said layer (B);
    wherein an interlaminar peeling strength [(A)/(B)] between the surface layer (A) and the intermediate layer (B) is in the range of 0.3 to 2.0 kg/15 mm; and wherein the interlaminar peeling strength [(B)/(C)] between the intermediate layer (B) and the base layer (C) is greater than the interlaminar peeling strength [(A)/(B)], and then thermoforming the container by pressing portions, which will become flanges of the molded container, under a press pressure of 1.0 to 10.0 kg/cm².

4. An easy opening container manufactured by the method described in claim 3.

5. The multi-layer structure of claim 1, wherein the surface layer (A) consists of said polypropylene resin.

6. The easy opening container of claim 2, wherein the surface layer (A) consists of said polypropylene resin.

7. The method of claim 3, wherein the surface layer (A) consists of said polypropylene resin.

8. The easy opening container of claim 4, wherein the surface layer (A) consists of said polypropylene resin.

* * * * *